United States Patent
Hardå et al.

(10) Patent No.: US 11,587,331 B2
(45) Date of Patent: Feb. 21, 2023

(54) LANE KEEPING FOR AUTONOMOUS VEHICLES

(71) Applicant: Zenuity AB, Gothenburg (SE)

(72) Inventors: Peter Hardå, Torslanda (SE); Mathias Westlund, Lerum (SE)

(73) Assignee: Zenuity AB, Gothenburg (SE)

( * ) Notice: Subject to any disclaimer, the term of this patent is extended or adjusted under 35 U.S.C. 154(b) by 84 days.

(21) Appl. No.: 17/002,952

(22) Filed: Aug. 26, 2020

(65) Prior Publication Data
US 2021/0064888 A1 Mar. 4, 2021

(30) Foreign Application Priority Data
Aug. 29, 2019 (EP) .................................... 19194353

(51) Int. Cl.
G06K 9/00 (2022.01)
G06V 20/56 (2022.01)

(52) U.S. Cl.
CPC ................................ G06V 20/588 (2022.01)

(58) Field of Classification Search
CPC .... G06V 20/588; B60W 20/50; B60W 10/18; B60W 30/09; B60W 30/0956; B60W 30/12; B60W 60/0059; B60W 2420/42; B60W 2420/52; B60W 2420/54; B60K 2370/175; B60T 2201/089; B60T 8/17557; B60T 2210/32
USPC ........................................................ 382/104
See application file for complete search history.

(56) References Cited

U.S. PATENT DOCUMENTS

| 8,996,197 B2 | 3/2015 | Joh et al. | |
|---|---|---|---|
| 2006/0015252 A1 | 1/2006 | Yamamoto et al. | |
| 2013/0286198 A1* | 10/2013 | Fan | G08G 1/04 348/143 |
| 2015/0354976 A1* | 12/2015 | Ferencz | G06V 20/588 382/104 |
| 2016/0231746 A1* | 8/2016 | Hazelton | G05D 1/0274 |
| 2017/0015288 A1 | 1/2017 | Coelingh et al. | |
| 2018/0059670 A1* | 3/2018 | Nilsson | B60W 30/09 |

(Continued)

OTHER PUBLICATIONS

Extended European Search Report dated Nov. 18, 2019 for European Patent Application No. 19194353.9, 9 pages.

(Continued)

*Primary Examiner* — Gims S Philippe
(74) *Attorney, Agent, or Firm* — Sage Patent Group

(57) ABSTRACT

A system for a lane keeping feature of a vehicle is provided. The lane keeping feature has a predefined safety requirement criterion for keeping the vehicle within bounds while the lane keeping feature is active. The system comprises a road estimation module and a trajectory planning module. The road estimation module is configured to receive sensor data comprising information about a surrounding environment of the vehicle, and to determine a drivable area based on the sensor data. The drivable area comprises a left boundary and a right boundary extending along a direction of travel of the vehicle, wherein each boundary comprises a plurality of points distributed along each boundary, each point being associated with a confidence level. The trajectory planning module is configured to receive the determined drivable area, and to determine a nominal trajectory for the vehicle based on the received drivable area.

14 Claims, 5 Drawing Sheets

(56) References Cited

U.S. PATENT DOCUMENTS

2018/0173970 A1\* 6/2018 Bayer .................. G06V 20/588
2018/0348779 A1\* 12/2018 Oniwa ................ G05D 1/0234
2020/0249684 A1\* 8/2020 Onofrio .............. G05D 1/0219
2020/0271458 A1\* 8/2020 Berry ................ G01C 21/3415
2021/0269027 A1\* 9/2021 Layer ................ B62D 15/0255

OTHER PUBLICATIONS

Author Unknown, "Automotive Safety Integrity Level", Wikipedia, https://en/wikipedia.org/wiki/Automotive_Safety_Integrity_Level, Dec. 1, 2017, 4 pages.
Office Action dated Dec. 19, 2022 for European Patent Application No. 19194353.9, 4 pages.

\* cited by examiner

LANE KEEPING FOR AUTONOMOUS VEHICLES

CROSS-REFERENCE TO RELATED APPLICATIONS

The present application for patent claims priority to European Patent Office Application Ser. No. 19194353.9, entitled "LANE KEEPING FOR AUTONOMOUS VEHICLES" filed on Aug. 29, 2019, assigned to the assignee hereof, and expressly incorporated herein by reference.

TECHNICAL FIELD OF THE INVENTION

The present disclosure relates to autonomous driving (AD) and advanced driver-assistance systems (ADAS). More specifically, the present disclosure relates to road modelling for vehicles.

BACKGROUND

During these last few years, the development of autonomous vehicles has exploded and many different solutions are being explored. Today, development is ongoing in both autonomous driving (AD) and advanced driver-assistance systems (ADAS), i.e. semiautonomous driving, within a number of different technical areas within these fields. One such area is how to position the vehicle with accuracy and consistency since this is an important safety aspect when the vehicle is moving within traffic.

Lane departures are a critical issue in AD systems and proper solutions to mitigate the risk of lane departures are of utmost importance. Therefore, for all lane support systems or any other steering system, precise and reliable generation of a road model is an important function.

A road model based on data from various sensors (e.g. forward vision, surround vision, LIDAR, radar, map, IMU sensors, etc.) is assumed to describe the drivable lane ahead of the vehicle, where the lane representation uncertainty increases with the distance from the vehicle. This is illustrated in FIG. 1(a). In more detail, FIG. 1(a) illustrates a top view of a vehicle 1' traveling within a lane, defined by the left and right lane markers 2a', 2b', and a lane trace projection 3a', 3b' defining the generated lane representation 3a', 3b' where the lines 3a', 3b' intersect a distance in front of the vehicle 1'. Since the reliability of the lane marker measurements (made by on board sensors) decreases with distance from the vehicle 1', the lane trace projections 3a', 3b' are increasingly curved inwards with increasing distance.

Furthermore, a strategy to mitigate the risk of the vehicle 1' inadvertently exiting the lane is to define a requirement that the vehicle 1' is able to come to a full stop within the currently available description 3a', 3b' of the target path (e.g. of the lane). This requirement (the vehicle 1' coming to a full stop within the available lane description) must be fulfilled at all times and all situations which results in strict requirements on in-vehicle systems and devices. Moreover, as a consequence of these strict requirements, the uncertainty or confidence levels of the lane trace estimate 3a', 3b' will limit the available distance for the vehicle 1' to come to a full stop. Consequently, the possible top speed of the vehicle is drastically limited which negatively impacts practicality and user experience of autonomous driving features. Moreover, the allowable vehicle top speed becomes a critical design parameter to consider for road modelling solutions since increasing the allowable top speed may drastically increase the requirements on system software and hardware.

There thus a need for new and improved solutions for lane keeping methods and systems for autonomous and semi-autonomous vehicles. In more detail, there is a need for new and improved solutions for lane keeping methods and systems which utilize road modelling modules.

SUMMARY OF THE INVENTION

It is therefore an object of the present disclosure to provide a system for lane keeping for a vehicle, a vehicle comprising such a system, a method, and a computer-readable, which alleviate all or at least some of the drawbacks of presently known systems.

More particularly, it is an object of the present disclosure to provide a solution for that with a given road model quality is allowing higher speeds than presently known systems. It is also an object of the present disclosure to provide a solution for allowing safe lane keeping at higher speeds in a more cost effective manner than presently known systems.

This object is achieved by means of a system for lane keeping for a vehicle, a vehicle comprising such a system, a method, and a computer-readable storage medium as defined in the appended claims. The term exemplary is in the present context to be understood as serving as an instance, example or illustration.

According to a first aspect of the present disclosure, there is provided a system for a lane keeping feature of a vehicle. The lane keeping feature has a predefined safety requirement criterion for keeping the vehicle within bounds while the lane keeping feature is active. The system comprises a road estimation module and a trajectory planning module. The road estimation module is configured to receive sensor data comprising information about a surrounding environment of the vehicle, and to determine a drivable area based on the sensor data. The drivable area comprises a left boundary and a right boundary extending along a direction of travel of the vehicle, wherein each boundary comprises a plurality of points distributed along each boundary, each point being associated with a confidence level. The trajectory planning module is configured to receive the determined drivable area, and to determine a nominal trajectory for the vehicle based on the received drivable area. The nominal trajectory is determined based on the predefined safety requirement criterion and a predefined availability criterion. The trajectory planning module is further configured to determine a back-up stop trajectory for the vehicle based on the received drivable area, where the back-up stop trajectory is determined based on a predefined confidence criterion. The predefined confidence criterion is dependent on a predefined value of frequency of back-up stops that is based on the predefined availability criterion for the nominal trajectory.

Hereby presenting a system capable of providing safe lane keeping at higher speeds than presently known solutions without increased hardware requirements (sensors, controllers, supporting systems, etc.).

As stated, a drivable area comprises a left and a right boundary extending along a direction of travel of the vehicle. Thus, the drivable area can be construed as a lane tracking or lane tracing feature having two projections representing the lane geometry in the surrounding environment of the vehicle. Accordingly, the left and right boundaries (i.e. left and right lane traces) have a confidence distribution dependent on a distance from the vehicle (or more specifically from the sensors of vehicle). In more detail, the increasing uncertainty of the lane boundaries'

(e.g. lane markers) location is an underlying factor as to why the projected lane traces taper inwards with the distance from the vehicle. Thus, the lane traces may be construed as a plurality of points distributed along each detected lane boundary, where each point is associated with a confidence level (e.g. a confidence distribution, a confidence function, a confidence value, etc.).

The predefined safety requirement criterion is in the present context to be understood as a probability of dangerous failure rate limit associated with a safety standard or a risk classification scheme such as e.g. Automotive Safety Integrity Level (ASIL) requirements. For example, for safety critical functions an ASIL D requirement may be applied which can be translated into a probability of dangerous failure rate limit of $10^{-9}$ h. The predefined availability criterion is in the present context a user defined or designer defined metric which will be further explained below. The predefined confidence criterion is the resulting requirement on the back-up stop feature, which also dictates a probability of dangerous failure rate limit.

The stringent requirements on the back-up stop trajectory planning have a limiting function on the achievable top speed of the vehicle, impairing the user experience of autonomous or semi-autonomous vehicles. In more detail, the safety requirements may be based on an Automotive Safety Integrity Level (ASIL) of the trajectory planning module in the form of a probability of dangerous failure rate limit, which is generally in the range of $10^7$-$10^9$. More specifically, the ASIL requirements dictate that the vehicle shall not unintentionally go out of "lane" more than once per $10^7$-$10^9$ hours, both for the nominal trajectory and the back-up stop trajectory (sometimes called safe stop trajectory). Stated differently, the vehicle is not allowed to deviate from either of the trajectories when executed (e.g. stop or move outside of the planned area) more than once per $10^7$-$10^9$ hours since this may have devastating consequences. For example, if the vehicle would come to a stop in an opposing lane and cause a head-on collision with another vehicle.

Thus, the present inventors realized that in order to allow a longer stopping distance, and thereby a higher allowable top speed, one should ease the requirement of frequency of stops in lane. Thus, by introducing a predefined availability criterion for the nominal trajectory (i.e. a type of metric defining that there is an updated trajectory available in a subsequent time step with a certain probability) the integrity level (i.e. safety requirement criterion) for the back-up stop feature can be alleviated by the same order of magnitude according to the following insight. In more detail, it was realized that if one introduces an availability criterion for the nominal trajectory, then one can introduce a corresponding predefined value of frequency of back-up stops for the back-up stop trajectory. Consequently this renders in a trajectory planning feature which is more cost effective than presently known solutions with maintained ASIL requirements. More specifically, the proposed solution allows an autonomous vehicle to operate at higher top speeds without introducing stricter requirements to e.g. sensor hardware and software (which adds significant cost).

Stated differently, by introducing a predefined value of frequency of stops in lane, the confidence criterion that the back-up stop manoeuvre keeps the vehicle within the projected drivable area (e.g. within the lane) can be reduced by the same order of magnitude as the predefined frequency of stops. For example from $10^{-8}$ to $10^{-4}$ if the predefined frequency of stops is once per $10^4$ hours. The reduced confidence criterion will enable for a longer stopping distance that will in turn allow for higher allowable top speeds.

Further, by assuming that a major part of the triggers to activate the safe stop feature will be caused by failures in the automated driving systems (ADS) or vehicle platform, such as e.g. hardware errors, software bugs, or the like, the reliability requirements can be spread out. In more detail, the present inventors realized that by "moving" a part of the requirements from the back-up stop trajectory planning module, and thereby offloading some of the "burden" to other parts of the system the total integrity levels can still be fulfilled. More specifically, one can define a quality metric related to the components or modules that control the probability of triggering a stopping manoeuvre (e.g. the road estimation module and perception system and associated sensors), which in turn will affect the likelihood of causing an actuation of the back-up stop trajectory wherefore the requirements on the same can be eased. In other words, the integrity level (ASIL grade) of the back-up stop system can be maintained at the required high level while still achieving useful top speeds (excess of 50 km/h).

The predefined availability criterion can in other words be construed as a quality management metric stating that the nominal trajectory will only be unavailable once per e.g. $10^4$ hours, meaning that the vehicle can operate based on the nominal trajectory for 10.000 hours before it will be forced to perform a back-up stop. Note that the nominal trajectory and back-up stop trajectory must be available (so that back-up stop trajectory can be executed in case the nominal becomes unavailable). Thus, the back-up stop will only be triggered once per $10^4$ hours wherefore one can reduce the predefined safety requirement criterion by the same magnitude, which results in a reduced predefined confidence criterion for the back-up stop trajectory.

According to a second aspect of the present disclosure, there is provided a vehicle comprising a perception system comprising at least one sensor for monitoring a surrounding environment of the vehicle, and a system according to any one of the embodiments disclosed herein. With this aspect of the disclosure, similar advantages and preferred features are present as in the previously discussed first aspect of the disclosure.

A perception system is in the present context to be understood as a system responsible for acquiring raw sensor data from on-board sensors such as cameras, LIDARs and RADARs, ultrasonic sensors, and converting this raw data into scene understanding.

Further, according to a third aspect of the present disclosure there is provided a method for a lane keeping feature of a vehicle. The lane keeping feature having a predefined safety requirement criterion for keeping the vehicle within bounds while the lane keeping feature is active. The method comprises receiving sensor data comprising information about a surrounding environment of the vehicle, and determining a drivable area based on the sensor data. The drivable area comprises a left boundary and a right boundary extending along a direction of travel of the vehicle. Moreover, each boundary comprises a plurality of points distributed along each boundary, each point being associated with a confidence level. The method further determining a nominal trajectory based on the drivable area, wherein the nominal trajectory is determined based on the predefined safety requirement criterion and a predefined availability criterion. Furthermore, the method comprises a back-up stop trajectory for the vehicle based on the drivable area, the back-up stop trajectory being determined based on a predefined confidence criterion. The predefined confidence criterion is dependent on a predefined value of frequency of back-up stops that is based on the predefined availability criterion for the nominal trajectory. With this aspect of the disclosure, similar advantages and preferred features are present as in the previously discussed first aspect of the disclosure.

Further, according to a fourth aspect of the present disclosure, there is provided computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
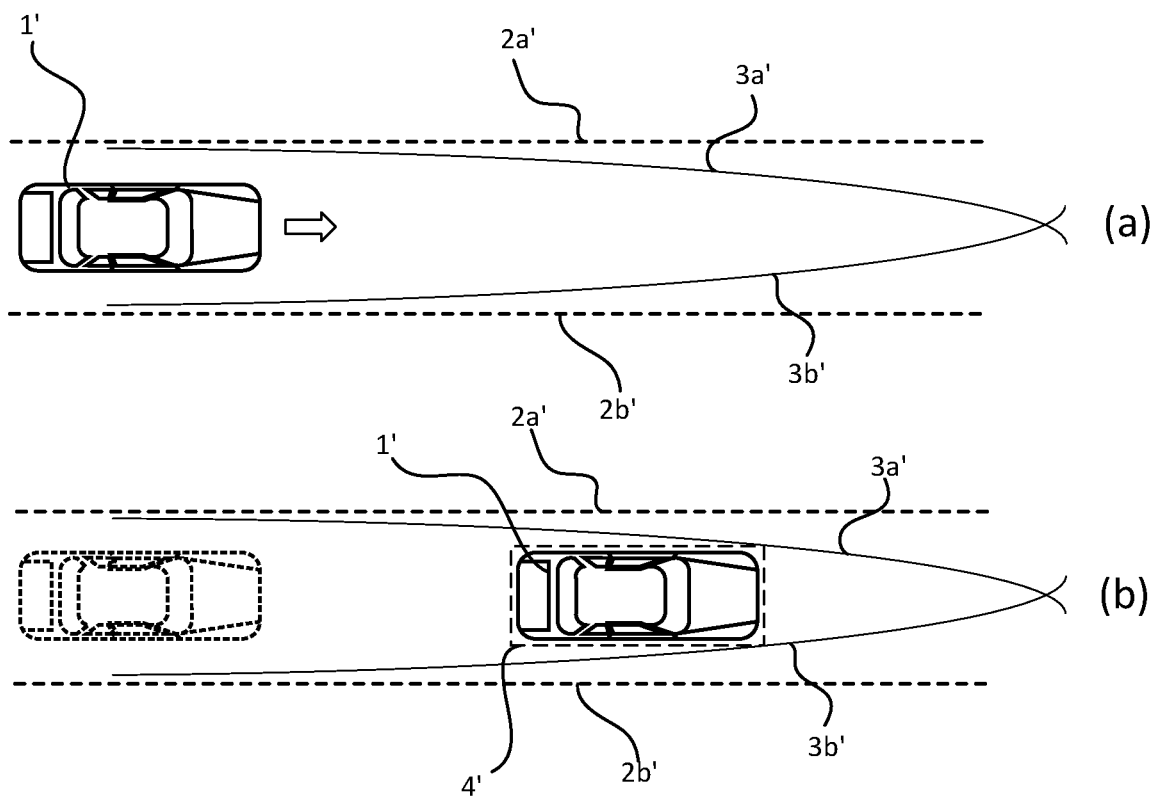
FIG. 1 is a schematic top view of a vehicle traveling on a road segment with projected road modelling features according to prior art.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The present disclosure is related to an autonomous (or semi-autonomous) vehicle's capability to detect, and more specifically handle, rare, hazardous events in a safe manner. The hazardous events may be internal to the vehicle system, for example in the form of sensor malfunctions, hardware malfunctions, software bugs, etc., or external, e.g. dangerous situations caused by surrounding traffic. These events cause violations of the nominal operational conditions, must be detected and countered by appropriate actions in order to fulfil safety requirements. The present disclosure is focused on hazardous internal events, and trajectory planning features.

In the following description of exemplary embodiments, the same reference numerals denote the same or similar components.

Figure 2:
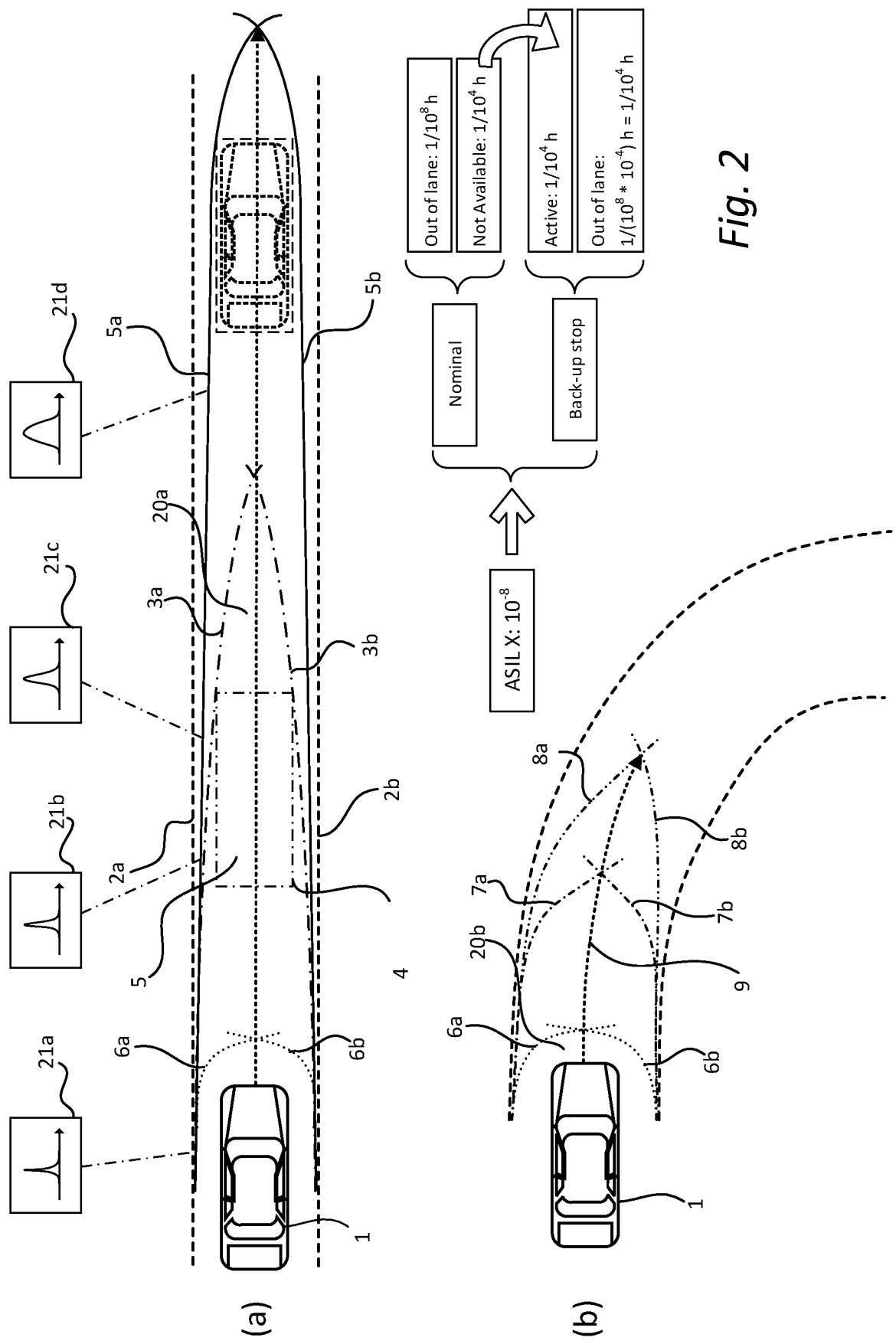
FIG. 2 is a schematic top view of a vehicle traveling on a road segment with projected road modelling features according to an embodiment of the present disclosure.

FIG. 2 shows two schematic drawings (a) and (b) which illustrate a top view perspective of a vehicle 1 on a road segment with projected trajectories. The trajectories define a time-dependent path in the traveling direction of the vehicle with left and right boundaries based on information associated with the determined drivable area 20a, 20b. More specifically, the top-most drawing (a) illustrates a back-up stop trajectory (may also be referred to as a safe stop trajectory) with a left boundary 5a and a right boundary 5b relative to a prior art back-up stop trajectory with left and right boundaries 3a, 3b. The bottom drawing (b) illustrates high-confidence parts of the nominal trajectory to satisfy a dynamic requirement (i.e. a requirement of keep the vehicle within the lane whilst operating under normal conditions) of the trajectory planning module.

It can be said that a control system for trajectory planning of an autonomous vehicle has two requirements, a dynamic requirement and a "safe stop" or "back-up stop" requirement. The dynamic requirement dictates that the control system must be able to keep the vehicle within the boundaries of the drivable area (e.g. within the lane). More specifically, the control system shall guarantee that the vehicle, within the capabilities of the vehicle platform, can keep the vehicle within the current lane (e.g. handle any upcoming curve with sufficiently high confidence). The safe stop requirement dictates that the vehicle must be able to stop within the boundaries of the drivable area (e.g. within the lane) to a predefined probability.

Thus, FIG. 2(a) illustrates the safe stop requirement, where the left boundary 5a and the right boundary 5b describe the lane ahead of the vehicle 1 with uncertainty increasing with the distance from the vehicle 1 as illustrated by the confidence distributions 21a-d. Therefore, the vehicle 1 must be able to come to standstill within the currently available description of the drivable area 20a. Here the drivable area is illustrated as a lane 20a, but can also be in the form of a path from a lane to a shoulder of the road, or to a roadside parking area. In general it can be said that the safe stop trajectory can include any path which avoids the vehicle coming to a stand-still in an area outside of a target path of the vehicle 1. The confidence levels are here illustrated as confidence distributions 21a-d, but may, as already realized by the skilled artisan, be provided in other formats such as a confidence value, a confidence range, a confidence function, etc.

To allow a longer stopping distance with the same sensor set it is necessary to ease the requirements on frequency of stop in lane. It is assumed that the major part of stop in lane will be caused by failures in the automated driving system (ADS) or vehicle platform. A consumer acceptable number of unplanned "back-up stops" is somewhere in the range of $1/10^3$ h-$1/10^5$ h, such as for example $1/10^4$. The reduced severity of the lane prediction will enable a longer stopping distance, as indicated by the difference between the prior art boundaries $3a'$, $3b'$ and the projected lane boundaries $5a$, $5b$ of the proposed solution. This is because the safety requirement criterion that the stop manoeuvre keeps the vehicle 1 in drivable area 20a can be reduced the same orders of magnitude as the frequency of stops. In this example from $10^{-8}$ to $10^{-4}$. Stated differently, since it is realized that the back-up stop manoeuvre will be "provoked" or activate with a lower frequency (defined by the availability criterion) it is possible to accept a greater uncertainty in the road model estimation 5a, 5b and thereby to allow the road boundaries 5a, 5b to have a longer extension, which in turn results in that higher top speeds can be achieved with the same sensor set as compared to currently known solutions.

However, for the dynamic requirement, the system can be arranged to utilize only a sub-portion of the nominal trajectory, i.e. only the portion where the boundaries are associated with a high confidence value 21a-d, as illustrated in FIG. 2(b). This is because the system does not need to allow a trajectory that can also bring the vehicle 1 to a "safe stop" within the drivable area 20b. Instead, one can define a safety requirement that the system shall guarantee that the vehicle 1, within the capabilities of the vehicle platform stays within the boundaries of a target path such as e.g. handling any upcoming curve with sufficiently high confidence. FIG. 2(b) illustrates these sub-portions of the nominal trajectory with high confidence values and their associated boundary projections 6a, 6b, 7a, 7b, 8a, 8b.

Accordingly, the present disclosure is at least partly based on the insight that the trajectory planning problem can be split into two parts. In more detail, a longer stopping distance is enabled by defining a value of frequency of stops, which in turn is enabled by the predefined availability criterion. The predefined availability criterion allows the system to rely on a high-confidence sub-portion 6a, 6b, 7a, 7b, 8a, 8b of the nominal trajectory since it is assumed that a new road model is generated in a subsequent time step. Naturally, the predefined availability criterion also specifies that a back-up stop trajectory is available at all times. In other words, there is a "high-confidence" nominal trajectory and a "sufficient confidence" back-up stop trajectory available at all times.

The block diagram in FIG. 2 illustrates how a regulatory performance requirement (here exemplified as an ASIL requirement) affects the safety requirement criterion for the nominal trajectory planning and for the back-up stop trajectory planning. As the skilled person realizes, ASIL is merely used as an example of a risk classification scheme, and that other and future risk classification schemes are analogously applicable. Thus, the performance requirement is in the present example derived from ASIL, but other standards are analogously applicable. The nominal trajectory is under a requirement defining that the vehicle may not unintentionally move out of the lane while the trajectory planning is active more than once per $10^8$ h. However, the proposed system is designed such that an availability criterion is provided which states that an updated road model, from which it is possible to derive a nominal as well as a back-up stop trajectory, is provided in a subsequent step with a predefined certainty. More specifically, the system is allowed to fail providing an updated road model in a subsequent time step only once per $10^4$ h. Consequently, one can alleviate the (confidence) requirement for the safe stop function by the same order of magnitude since the overall system will still fulfil the general criterion of achieving a probability of dangerous failure rate limit of less than $10^{-8}$ h.

Figure 3:
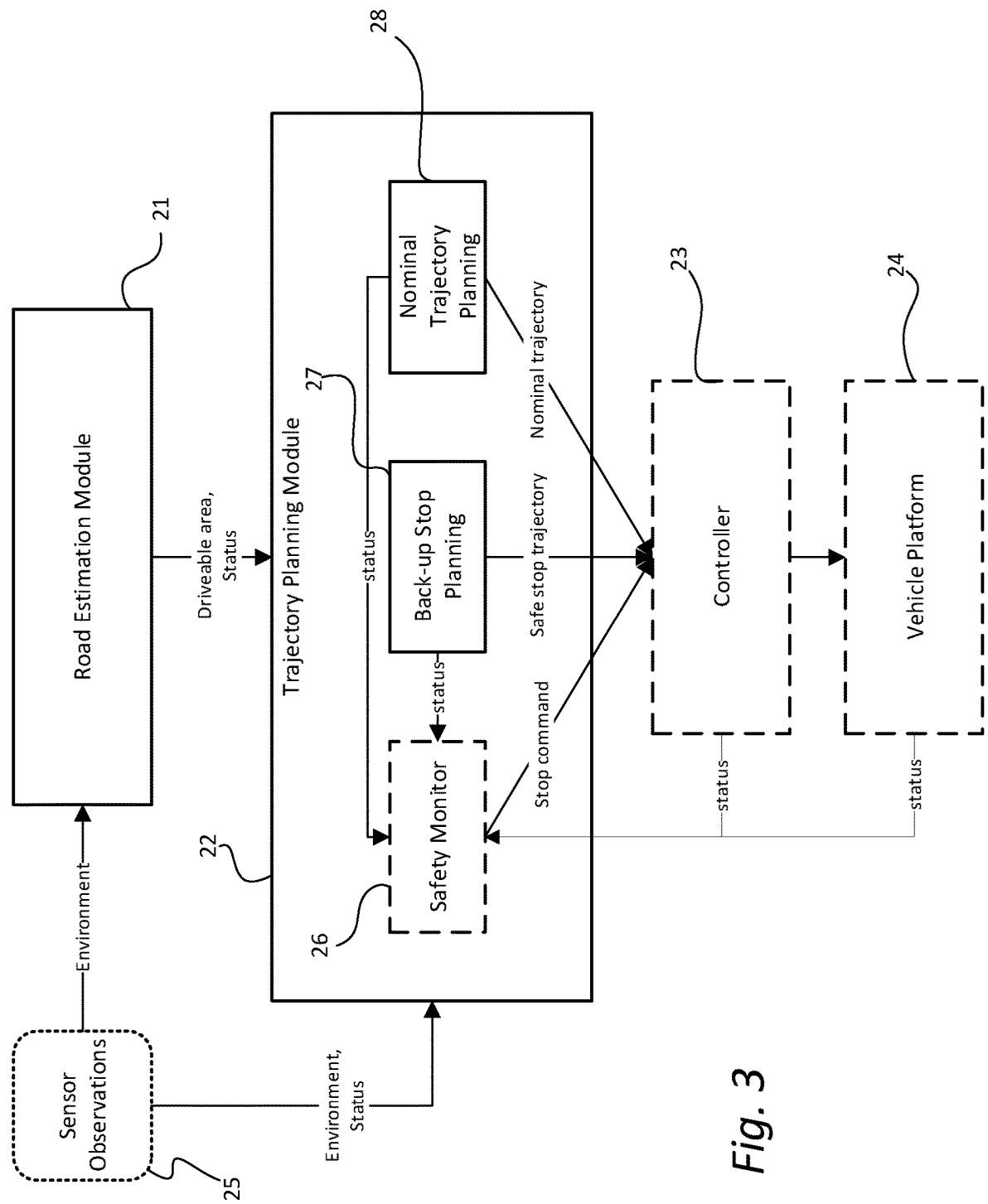
FIG. 3 is a schematic block diagram representation of a system for controlling a lane keeping feature of a vehicle according to an embodiment of the present disclosure.

FIG. 3 is a schematic block diagram illustrating a system for controlling a lane keeping feature of a vehicle. In more detail, the system disclosed herein is analogously suitable for any ADAS or AD feature dealing with road modelling and the associated trajectory planning. The lane keeping feature has a predefined safety requirement criterion (e.g. ASIL C or ASIL D) for keeping the vehicle within bounds while the lane keeping feature is active.

The system has a road estimation module 21 and a trajectory planning module 22. The road estimation module is configured to receive sensor data 25 comprising information about a surrounding environment of the vehicle. The sensor data may be obtained from a perception system of the vehicle or directly from one or more sensors connected to the system. A perception system is in the present context to be understood as a system responsible for acquiring raw sensor data from on-board sensors such as cameras, LIDARs and RADARs, ultrasonic sensors, and converting this raw data into scene understanding. The road estimation module is further configured to determine a drivable area based on the sensor data 25. The drivable area left boundary and a right boundary extending along a direction of travel of the vehicle. Each boundary comprises a plurality of points distributed along each boundary, and each point is associated with a confidence level (e.g. a confidence distribution). Normally, the confidence level decreases with the distance away from the vehicle.

Further, the trajectory planning module 22 is configured to receive the drivable area from the road estimation module 21. The trajectory planning module 22 is further configured to determine or generate a nominal trajectory based on the received drivable area, wherein the nominal trajectory is determined based on the predefined safety requirement criterion and a predefined availability criterion. Moreover, the trajectory planning module 22 is configured to also determine a back-up stop trajectory (also known as a safe stop trajectory) for the vehicle based on the received drivable area. The back-up stop trajectory is determined based on a predefined confidence criterion. More specifically, the predefined confidence criterion is dependent on a predefined value of frequency of back-up stops that is based on the predefined availability criterion for the nominal trajectory.

As mentioned in the foregoing, the predefined availability criterion is a parameter that is a newly introduced system design aspect, and can be said to introduce a "guarantee" that a new or updated trajectory (nominal and back-up stop)

is produced at a subsequent time step. This insight that lead to this design consideration in the form of an availability parameter has some advantageous consequences in the form of an alleviated back-up stop confidence criterion.

The trajectory planning module 22 may comprise a number of sub modules as illustrated in the schematic drawing of FIG. 3. For example, the trajectory planning module may comprise a separate module for nominal trajectory planning 28 and back-up stop planning 27. Moreover, the trajectory planning module may comprise a safety monitor 26. The safety monitor 26 is preferably configured to detect errors and generate suitable commands to mitigate dangerous situations. The safety monitor 26 is preferably in the form of a high integrity component dedicated for safety only. Thus, the safety monitor 26 is configured to receive and monitor a status of internal components.

Thus, the trajectory planning module 22 can be said to comprise two separate channels, one for nominal planning and one for safety. This provides a higher availability of the back-up stop capability. Accordingly, the sensor data 25 comprising information about the surrounding environment of the vehicle is preferably received independently in each channel.

The system furthermore has a vehicle control module 23 configured to obtain the nominal trajectory and the back-up stop trajectory, and to send a control signal to at least one actuator (here represented as a vehicle platform 24) in order to maneuver the vehicle based on the determined nominal trajectory or the back-up stop trajectory. However, the illustrated architecture of the system is merely an exemplary realization, as readily understood by the skilled reader, various alternatives are feasible and within the scope of the present disclosure.

For example, the control module 23 may be comprised by the vehicle platform 24. Also, the vehicle platform may comprise one or more storage devices for storing the back-up stop trajectory generated by the trajectory planning module 22, which is executed upon activation by a safety monitor 26.

In use, the road estimation module 21 receives the sensor observations 25 and generates a drivable area for the vehicle. The drivable area is defined by one or more boundaries which are associated with a confidence level. For example, the drivable area may be in the form of a lane, and the boundaries may be the left and right lane markings. Accordingly, the road estimation module 21 is capable to define lane boundaries close to the vehicle with a higher accuracy than lane boundaries far from the vehicle. The trajectory planning module 22 obtains this drivable area and generates a trajectory for the vehicle (e.g. in the form of a path and acceleration data) which is restricted by a safety requirement criterion dictating that the vehicle must stay within the boundaries of the drivable area (e.g. within the lane). In more detail, the trajectory planning module 22 computes a nominal trajectory and a back-up stop trajectory, where only a sub-portion of the nominal trajectory is used to satisfy the dynamic requirement as discussed in the foregoing, enabled by the predefined availability criterion. Moreover, the predefined availability criterion results in a relieved safety requirement criterion for the back-up stop function, which herein is defined as a "predefined confidence criterion".

Figure 4:
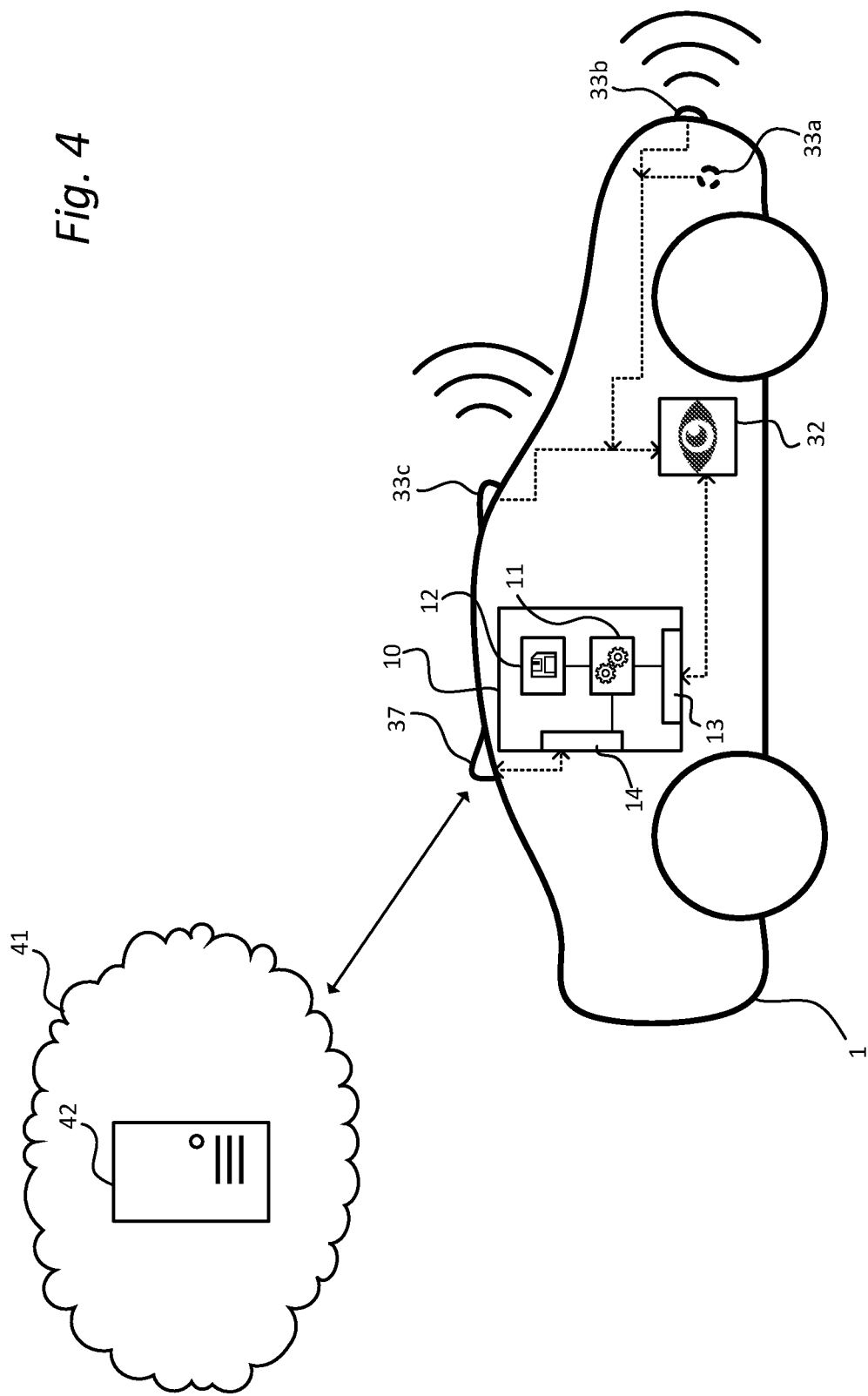
FIG. 4 is a schematic side view illustration of a vehicle comprising a system for controlling a lane keeping feature of the vehicle in accordance with an embodiment of the present disclosure.

FIG. 4 is a schematic side view of a vehicle 1 comprising a system 10 for controlling a lane keeping feature according to any one of the embodiments disclosed herein. The vehicle 1 further comprises a perception system 32 connected to a plurality of sensor devices 33a-c. The perception system is responsible for acquiring raw sensor data from the sensor devices 33a-c, which may be in the form of cameras, LIDARs, RADARs, ultrasonic sensors, accelerometers, gyroscopes, or any other automotive grade sensor, and converting this raw data into scene understanding. The vehicle 1 may naturally also comprise other suitable support systems such as a localization system, an inertial measurement unit (IMU), and the like.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for controlling a lane keeping feature of a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The different modules of the system 10 may comprise independent control circuitry 11, memory devices 12, sensor interfaces 13 and communication interfaces 14 or be configured to as software modules within a common hardware device.

Further, the vehicle 1 may be connected to external network(s) 41 via for instance a wireless link (e.g. for retrieving map data). The same or some other wireless link may be used to communicate with other vehicles in the vicinity of the vehicle 1 or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels. Thus, the system 1 may be arranged to perform some or all of the method steps by means of resources 42 remote to the vehicle 1, by so-called cloud computing solution.

Figure 5:
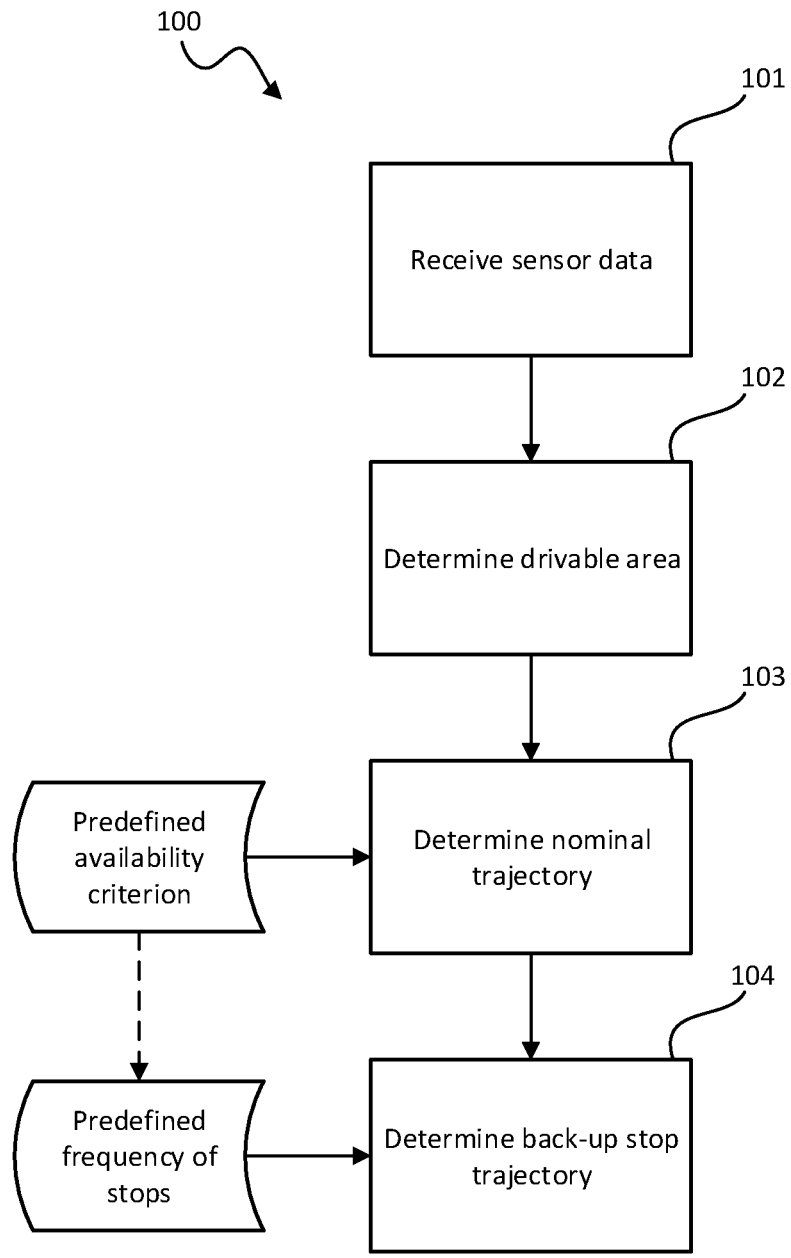
FIG. 5 is a schematic flow chart representation of a method for controlling a lane keeping feature of a vehicle according to an embodiment of the present disclosure.

FIG. 5 is a schematic flow chart representation of a method 100 for controlling a lane keeping feature of a vehicle in accordance with an embodiment of the present disclosure. The lane keeping feature has a predefined safety requirement criterion for keeping the vehicle within bounds while the lane keeping feature is active. The method 100 comprises a step of receiving 101 sensor data (originating from one or more sensor devices of the vehicle). The sensor data comprises information about a surrounding environment of the vehicle. The method 100 further comprises determining 102 a drivable area based on the received sensor data. The drivable area comprises a left boundary and a right boundary extending along a direction of travel of the vehicle. Stated differently, the drivable area is defined by one or more boundaries. Each boundary comprises (or is based on) a plurality of points distributed along each boundary, where each point is associated with a confidence level. The confidence level can be understood as a value describing a probability that the representation of the boundary is located at exactly the same location as the boundary in the surrounding area of the vehicle. For example, if the boundaries are assumed to be lane boundaries, then the confidence level defines the probability that the "perceived" boundaries (and the subsequent projected lane traces) are located at the same position as the actual lane markings upon which the lane traces are based.

The method 100 further comprises determining 103 a nominal trajectory based on the received drivable area. The nominal trajectory is determined further based on the predefined safety requirement criterion and a predefined availability criterion. As mentioned, the predefined safety requirement criterion is dictated based on regulatory integrity levels, while the predefined availability criterion is a well-considered quality management metric. Further, the method 100 comprises determining a back-up stop trajectory (may also be referred to as a safe stop trajectory) for the vehicle based on the drivable area. The back-up stop trajectory is determined further based on a predefined confidence criterion. The predefined confidence criterion is however dependent on a predefined value of frequency of back-up stops that in turn is based on the predefined availability criterion for the nominal trajectory. In more detail, the predefined confidence criterion for the back-up stop trajectory is computed based on the overall safety requirement criterion and the predefined value of frequency of back-up stops. Thus, by cleverly realizing that a quality management (QM) metric can be used to define a frequency of back-up stops, the otherwise too strict safety requirements on the back-up stop feature can be alleviated, rendering in an improved overall user experience.

Executable instructions for performing these functions are, optionally, included in a non-transitory computer-readable storage medium or other computer program product configured for execution by one or more processors.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The system 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly (form the sensors 33a-c) or via dedicated sensor control circuitry 32 in the vehicle 1. The communication/antenna interface 14 may further provide the possibility to send output to a remote location (e.g. remote server 42) by means of the antenna 37. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server 42 in communication with the vehicle, a so called cloud solution. For instance, sensor data may be sent to an external system and that system performs the step to determine a drivable area. The drivable area may further be based on a location of the vehicle 1 and from sensor observations obtained from other vehicles. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of determining a nominal trajectory and a back-up stop trajectory may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A system for controlling a lane keeping feature of a vehicle, the lane keeping feature having a predefined safety requirement criterion for keeping the vehicle within bounds while the lane keeping feature is active, the system comprising:
a road estimation module configured to:
receive sensor data comprising information about a sur-rounding environment of the vehicle;
determine a drivable area based on the sensor data, the drivable area comprising a left boundary and a right boundary extending along a direction of travel of the vehicle, wherein each boundary comprises a plurality of points distributed along each boundary, each point being associated with a confidence level; and
a trajectory planning module configured to:
receive the determined drivable area;
determine a nominal trajectory based on the received drivable area, wherein the nominal trajectory is further determined based on the predefined safety requirement criterion and a predefined availability criterion; and
determine a back-up stop trajectory for the vehicle based on the received drivable area, the back-up stop trajectory being further determined based on a predefined confidence criterion,
wherein the predefined confidence criterion is dependent on a predefined value of frequency of back-up stops that is based on the predefined availability criterion for the nominal trajectory.

2. The system according to claim 1, further comprising:
a vehicle control module configured to:
obtain the determined nominal trajectory and the determined back-up stop trajectory; and
send a control signal to at least one actuator in order to manoeuvre the vehicle based on the determined nominal trajectory or the back-up stop trajectory.

3. The system according to claim 1, wherein the predefined availability criterion defines a probability of an updated nominal trajectory not being available in a subsequent time step.

4. The system according to claim 1, wherein the nominal trajectory is based on a first subset of points of the plurality of points, the first subset of points being associated with a confidence level above a first predefined threshold.

5. The system according to claim 4, wherein a back-up stop trajectory is based on a second subset of points of the plurality of points, the second subset of points being associated with a confidence level above a second predefined threshold, wherein the second predefined threshold is lower than the first predefined threshold.

6. The system according to claim 5, wherein the back-up stop trajectory has a first time horizon and the nominal trajectory has a second time horizon, the first time horizon being longer than the second time horizon.

7. The system according to claim 1, wherein the predefined value of frequency of stops in lane is in the range from one stop per $10^3$ h to one stop per $10^5$ h.

8. The system according to claim 1, wherein the predefined availability criterion is in the range from not available once per $10^3$ h to not available once per $10^5$ h.

9. A vehicle comprising:
a perception system comprising at least one sensor for monitoring a surrounding environment of the vehicle;
a system for controlling a lane keeping feature of a vehicle, the lane keeping feature having a predefined safety requirement criterion for keeping the vehicle within bounds while the lane keeping feature is active, the system comprising:
a road estimation module configured to:
receive sensor data comprising information about a surrounding environment of the vehicle;
determine a drivable area based on the sensor data, the drivable area comprising a left boundary and a right boundary extending along a direction of travel of the vehicle, wherein each boundary comprises a plurality of points distributed along each boundary, each point being associated with a confidence level; and
a trajectory planning module configured to:
receive the determined drivable area;
determine a nominal trajectory based on the received drivable area, wherein the nominal trajectory is further determined based on the predefined safety requirement criterion and a predefined availability criterion; and
determine a back-up stop trajectory for the vehicle based on the received drivable area, the back-up stop trajectory being further determined based on a predefined confidence criterion,
wherein the predefined confidence criterion is dependent on a predefined value of frequency of back-up stops that is based on the predefined availability criterion for the nominal trajectory.

10. A method for controlling a lane keeping feature of a vehicle, the lane keeping feature having a predefined safety requirement criterion for keeping the vehicle within bounds while the lane keeping feature is active, the method comprising:
receiving sensor data comprising information about a surrounding environment of the vehicle;
determining a drivable area based on the sensor data, the drivable area comprising a left boundary and a right boundary extending along a direction of travel of the vehicle, wherein each boundary comprises a plurality of points distributed along each boundary, each point being associated with a confidence level;
determining a nominal trajectory based on the drivable area, wherein the nominal trajectory is further determined based on the predefined safety requirement criterion and a predefined availability criterion; and determining a back-up stop trajectory for the vehicle based on the drivable area, the back-up stop trajectory being further determined based on a predefined confidence criterion, wherein the predefined confidence criterion is dependent on a predefined value of frequency of back-up stops that is based on the predefined availability criterion for the nominal trajectory.

11. The method according to claim 10, further comprising:

sending a control signal to at least one actuator in order to manoeuvre the vehicle based on the determined nominal trajectory or the back-up stop trajectory.

12. The method according to claim 10, wherein the predefined value of frequency of stops in lane is in the range from one stop per $10^3$ h to one stop per $10^5$ h.

13. The method according to claim 10, wherein the predefined availability criterion is in the range from not available once per $10^3$ h to not available once per $10^5$ h.

14. A non-transitory computer-readable storage medium storing one or more programs configured to be executed by one or more processors of a vehicle control system, the one or more programs comprising instructions for performing the method for controlling a lane keeping feature of a vehicle, the lane keeping feature having a predefined safety requirement criterion for keeping the vehicle within bounds while the lane keeping feature is active, the method comprising:

receiving sensor data comprising information about a surrounding environment of the vehicle;

determining a drivable area based on the sensor data, the drivable area comprising a left boundary and a right boundary extending along a direction of travel of the vehicle, wherein each boundary comprises a plurality of points distributed along each boundary, each point being associated with a confidence level;

determining a nominal trajectory based on the drivable area, wherein the nominal trajectory is further determined based on the predefined safety requirement criterion and a predefined availability criterion; and determining a back-up stop trajectory for the vehicle based on the drivable area, the back-up stop trajectory being further determined based on a predefined confidence criterion, wherein the predefined confidence criterion is dependent on a predefined value of frequency of back-up stops that is based on the predefined availability criterion for the nominal trajectory.

* * * * *